United States Patent

[11] 3,604,264

[72] Inventor Leon J. Nowak
  Oxford Towne Apartments, Gateshead Rd.,
  New Hartford, N.Y. 13413
[21] Appl. No. 887,530
[45] Patented Sept. 14, 1971

[54] FLOWMETER
  3 Claims, 6 Drawing Figs.
[52] U.S. Cl. ................................................. 73/228, 73/223
[51] Int. Cl. ................................................. G01f 1/06
[50] Field of Search ........................................... 73/223, 217, 228

[56] References Cited
  UNITED STATES PATENTS
  1,637,927  8/1927  Bonn ........................... 73/228
  1,788,976  1/1931  Beraud et al. ................. 73/228

Primary Examiner—Richard C. Queisser
Assistant Examiner—John P. Beauchamp
Attorney—D. Emmett Thompson ABSTRACT: A container is mounted in an enclosure for movement along a fixed path. The enclosure has an outlet connected to a suction line, such as a pump, and an inlet is arranged to discharge liquid into the container. The container is moved along the path by the weight of the liquid accumulating in the container. The container is provided with discharge means which functions automatically to increase the volume of liquid discharged from the container, the arrangement being such that the discharge is equal to the flow of liquid into the container, whereby the container is moved to a position proportional to the volume of the flow of liquid into and out of the container. Position indicating means is actuated by the container to indicate the position thereof at all times, thus indicating the flow of liquid through the meter. The container discharge means is adjustable exteriorly of the enclosure to accurately indicate the flow of liquids of different densities.

PATENTED SEP 14 1971 3,604,264

INVENTOR.
LEON J. NOWAK.
BY
D. Emmett Thompson
ATTORNEY.

FLOWMETER

BACKGROUND OF THE INVENTION

There are many types of flowmeters in use. Those designed to continually indicate the volume of liquid flow involve complicated, bulky and costly structures, not adapted for use as fuel consumption indicators for motor vehicles, boats, etc.

This invention has as an object a flow indicating meter embodying a particularly compact structure, economical to manufacture and which functions to constantly give an accurate reading of the volume of liquid flowing through the meter. The meter has only one moving part, and has as a further object means adjustable exteriorly of the meter enclosure for accommodating liquids of different densities.

BRIEF SUMMARY OF THE INVENTION

The tank or container is mounted in a sealed enclosure having an inlet discharging into the container. Preferably, the container is mounted for rotation about a fixed axis whereby it moves in an arcuate path. Means is provided for yieldingly resisting movement of the container by the weight of the liquid therein, preferably in the form of a counterweight.

The container is provided with a discharge opening, or passageway, and the arrangement is such that the volume of the flow through the discharge increases with the increase in the volume of liquid in the container to maintain the discharge from the container equal to the discharge of liquid therein.

DETAILED DESCRIPTION

The enclosure consists of a circular base plate 10 to which is attached a cylindrical cup-shaped casing 11, as by screws 12. A sealing ring 13 is interposed between the face plate and the abutting annular surface of the casing 11.

Figure 5:
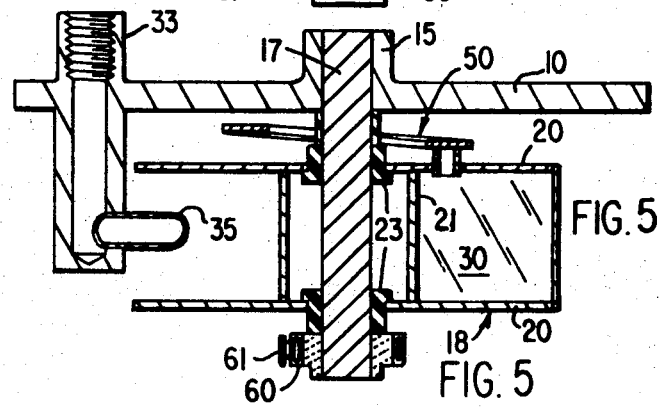
FIG. 5 is a view taken on a line corresponding to line 5—5, FIG. 3.
Figure 1:
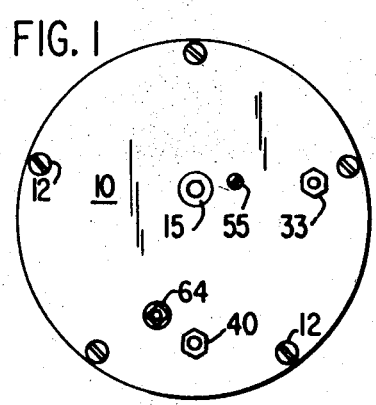
FIG. 1 is a front elevational view of a flowmeter embodying my invention, the view looking to the right in FIG. 2.

The face plate 10 is formed with a centrally located hub 15 in which there is fixedly mounted a shaft 17. A tank, or container, generally designated 18, is journaled on the shaft 17. The container 18 consists of discoidal side members 20 fixed to the ends of a sleeve 21. Bearings 23 are mounted at the center of the disks 20 and have a running fit on the shaft 17, see FIG. 5. An arcuate strip 27 of semicircular form is fixed to the periphery of the plates 20. A wall 30 extends radially from the sleeve 21 and merges with one end of the strip 27. The wall plate 30, in conjunction with the contiguous portion of the strip 27 and sleeve 21, forms a container.

The enclosure is formed with an inlet 33 extending through the plate 10 and communicating with a tube 35 of semicircular form. The inner open end of the tube 35 terminates above the wall plate 30 when the container 18 is in minimum flow position, as shown in FIG. 3.

Figure 2:
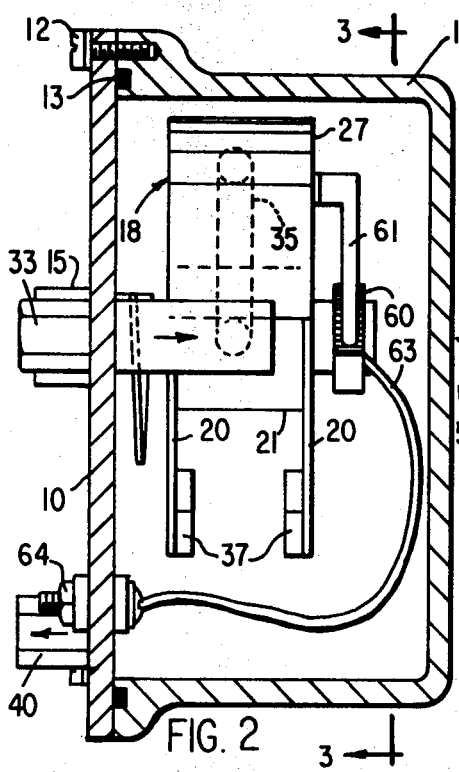
FIG. 2 is a side elevational view of the meter with the enclosure being shown in cross section.
Figure 3:
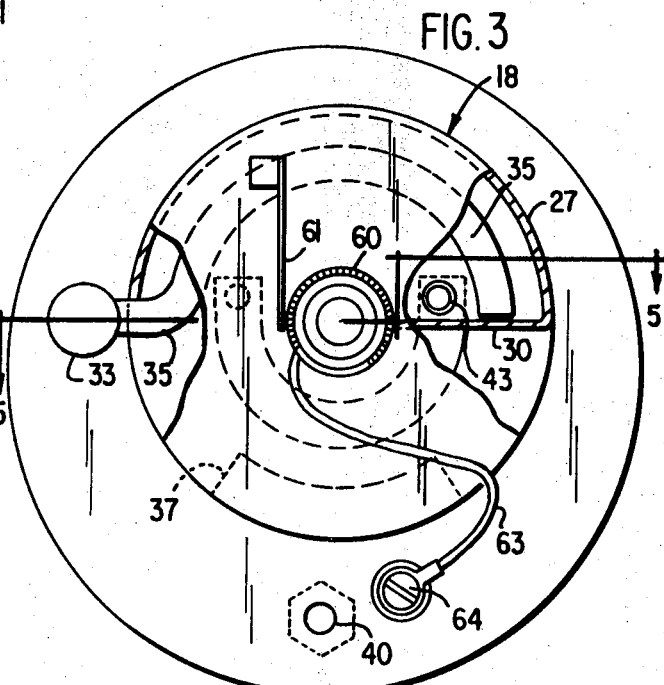
FIG. 3 is a view taken on line 3—3, FIG. 2, with portions of a sidewall of the container broken away and parts shown in section.
Figure 4:
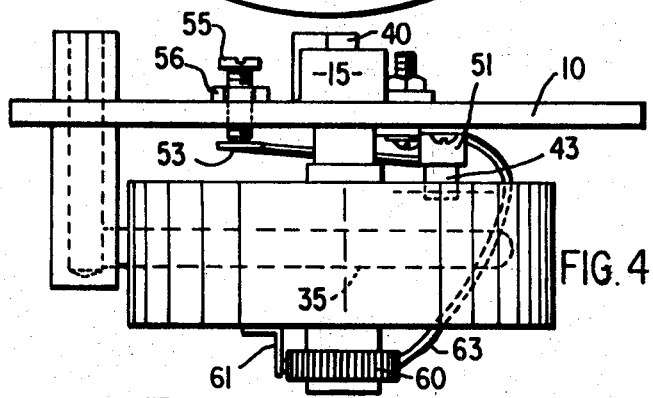
FIG. 4 is a top plan view looking down in FIG. 2, with the enclosure casing removed.
Figure 6:
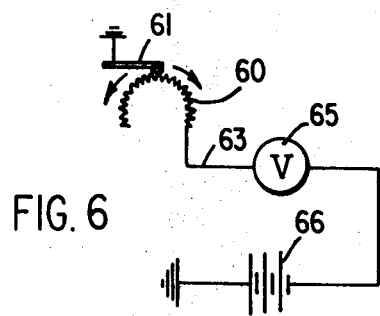
FIG. 6 is a schematic wiring diagram.

One or more counterweights 37 are attached to the container sideplates 20 and serve to yieldingly maintain the container in the position shown in FIG. 3.

The enclosure is provided with an outlet 40 connected to a suction line, such as the intake of a fuel pump. Upon operation of the pump, a vacuum is produced in the enclosure, effecting a flow of liquid through the tube 35 into the container 18. As the liquid accumulates in the container, the weight of the liquid will cause the container to rotate about the axis 17 in a clockwise direction in FIG. 3.

The container 18 is provided with a discharge passage 43 located in one of the sideplates 20 in proximity to the wall 30 of the container. Accordingly, as liquid is discharged into the container through tube 35, it flows out through the passage 43. This passage 43 constitutes part of the liquid discharge means which functions to permit increase in the outflow of liquid from the container as it is moved toward the maximum flow position—that is, as the container is moved in a clockwise direction, FIG. 3. To accomplish this result, an arcuate valve plate 50 is fixedly mounted intermediate the sideplate 20 of the container and the face plate 10 of the enclosure. One end of this plate is fixed to a spacer 51 which, in turn, is fixed to the inner surface of the plate 10. The valve plate 50 is formed on a radius comparable to the radius of the path in which the discharge 43 moves. The fixed end of the plate 50 is positioned in proximity to the outlet 43 and the plate is in the form of a partial helix, whereby the plate diverges from the plane in which the outlet 43 moves, with the free end 53 of the plate being spaced a greater distance from the container. The plate is formed of spring metal and the angle of the helix, or the angle of divergence, may be adjusted by a screw 55 threaded through plate 10 and maintained in adjusted position by jam nut 56.

With this arrangement, as the container moves in clockwise direction, FIG. 3, the confronting surface of the plate 53 diverges from the outlet so that the flow of liquid therethrough is increased. The plate 53 is adjusted so that the outflow from the container in any position equals the inflow through tube 35, this adjustment adapting the meter for use with liquids of different densities.

A variable resistor 60 is fixedly mounted on the inner end of the shaft 17. A wiper arm 61 is attached to the inner sidewall 20 of the container. One end of the resistor 60 is connected by wire 63 to a terminal 64 extending through an insulator mounted in the baseplate 10 and extending therethrough. The meter is connected to ground. An electric meter 65 has one side connected to the terminal 64, and the opposite side to a battery 66. This arrangement constitutes a variable resistance actuated by movement of the container, the meter serving as an indicating means to continuously show the position of the container and, as will be apparent, the volume of flow therethrough at all times.

What I claim is:

1. A constant flow indicating meter comprising a sealed enclosure having a liquid inlet and an outlet, said inlet being connected to a liquid line, a container pivotally mounted in said enclosure for movement over an arcuate fixed path, said inlet being arranged to discharge liquid into said container, said container being movable by the weight of the liquid therein along said path from a minimum flow position toward a maximum flow position, the distance of such movement being proportional to the volume of liquid in the container, means yieldingly resisting movement of said container toward said maximum position, said container being provided with a liquid discharge passage, an arcuate valve plate mounted in said enclosure and having a surface confronting said discharge passage, one end of said surface being located in close proximity to said discharge passage when said container is in minimum flow position, the surface of said plate extending from said end in a plane diverging from the plane of movement of said discharge passage, whereby the distance between said discharge passage and said plate surface increases as said container is moved along said path toward said maximum flow position.

2. A flow indicating meter as set forth in claim 1, including means operable externally of said enclosure to vary the divergence of said valve plate surface relative to the path of movement of said discharge passage.

3. A flow indicating meter as set forth in claim 1, including a variable resistor fixedly mounted in said enclosure and a contact brush fixed to said container and engaging said resistor.